US 9,096,253 B2

(12) United States Patent
Tamaizumi

(10) Patent No.: US 9,096,253 B2
(45) Date of Patent: Aug. 4, 2015

(54) ELECTRIC POWER STEERING APPARATUS

(71) Applicant: JTEKT CORPORATION, Osaka-shi, Osaka (JP)

(72) Inventor: Terutaka Tamaizumi, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/141,163

(22) Filed: Dec. 26, 2013

(65) Prior Publication Data

US 2014/0207337 A1 Jul. 24, 2014

(30) Foreign Application Priority Data

Jan. 18, 2013 (JP) ................................. 2013-007580

(51) Int. Cl.
*B62D 6/00* (2006.01)
*B62D 5/04* (2006.01)
(52) U.S. Cl.
CPC .............. *B62D 6/008* (2013.01); *B62D 5/0463* (2013.01)
(58) Field of Classification Search
USPC ........................................... 701/42; 180/446
See application file for complete search history.

(56) References Cited

U.S. PATENT DOCUMENTS

| | | | |
|---|---|---|---|
| 2003/0106736 A1* | 6/2003 | Kogiso et al. ................. | 180/446 |
| 2005/0021203 A1* | 1/2005 | Iwazaki et al. ................. | 701/36 |
| 2005/0027415 A1* | 2/2005 | Iwazaki et al. ................. | 701/36 |
| 2006/0289226 A1 | 12/2006 | Sugitani | |
| 2007/0205041 A1* | 9/2007 | Nishizaki et al. ............. | 180/446 |
| 2011/0010052 A1* | 1/2011 | Limpibunterng et al. ...... | 701/41 |
| 2014/0005891 A1* | 1/2014 | Brown et al. ................... | 701/41 |

FOREIGN PATENT DOCUMENTS

| | | |
|---|---|---|
| DE | 10 2006 025 380 A1 | 12/2006 |
| JP | A-2006-175940 | 7/2006 |
| JP | B2-4453012 | 4/2010 |
| WO | WO 2012/133590 A1 | 10/2012 |

OTHER PUBLICATIONS

Extended European Search Report issued in European Patent Application No. 14150900.0 dated Apr. 30, 2014.

* cited by examiner

*Primary Examiner* — Thomas G Black
*Assistant Examiner* — Tyler Paige
(74) *Attorney, Agent, or Firm* — Oliff PLC

(57) ABSTRACT

The control apparatus calculates the first assist component on the basis of the steering torque. The control apparatus calculates the turning angle command value from the steering torque and the first assist component on the basis of the ideal model, executes turning angle feedback control for matching the actual turning angle with the turning angle command value, and calculates the second assist component. The control apparatus adds the second assist component to the first assist component to calculate the assist command value. When the deviation between the actual turning angle and the turning angle command value is out of the allowable range, the control apparatus changes the ideal model to remove the second assist component from the assist command value and enhance convergence of the turning angle feedback control system.

8 Claims, 6 Drawing Sheets

ELECTRIC POWER STEERING APPARATUS

BACKGROUND OF THE INVENTION

The present invention relates to an electric power steering apparatus for applying assist torque of a motor to a steering mechanism of a vehicle to assist a driver in a steering operation.

An electric power steering apparatus of this kind is described in Japanese Patent No. 4453012. The electric power steering apparatus in Japanese Patent No. 4453012 is provided with a first reference model for setting target steering torque on the basis of a steering angle, and a second reference model for setting a target turning angle of a steering system on the basis of steering torque. Driving of a motor is controlled on the basis of a control signal (assist command value) set by both reference models (ideal models). In such a case, torque feedback control is executed to cause actual steering torque to follow target steering torque. A first assist component obtained by the torque feedback control is then included in the assist command value, so that the steering torque can be always set at an optimal value. Moreover, turning angle feedback control is executed to cause an actual turning angle to follow a target turning angle. A second assist component obtained by the turning angle feedback control is then included in the assist command value, so that reverse input vibration from a steerable wheel can be cancelled.

However, with the electric power steering apparatus described in Japanese Patent No. 4453012, a deviation between the actual turning angle and the target turning angle sometimes increases remarkably in execution of the turning angle feedback control. In such a case, control becomes unstable. That is, when the deviation between the actual turning angle and the target turning angle is too large, it is impossible to apply assist torque corresponding to the deviation. When the turning angle feedback control is continued in such a situation, shortage of assist torque is promoted and an appropriate target turning angle cannot be calculated. Accordingly, control becomes unstable. In such a case, it is desirable to remove the second assist component from the assist command value in order to stabilize control. It is also desirable to continue calculation of the second assist component while the second assist command value is removed from the assist command value. In such a manner, a settling time for the turning angle feedback control can be shortened when an increase in the deviation between the actual turning angle and the target turning angle is reduced and the second assist component is included again in the assist command value.

On the other hand, when the second assist component is removed from the assist command value as described above, characteristics of a control system are changed substantially. Here, an ideal model is set in view of the convergence in the control system. However, when the characteristics of the control system are changed, it becomes difficult to ensure the convergence and self-excited vibration may occur in the ideal model. When self-excited vibration occurs in the ideal model, it is impossible to calculate an appropriate target turning angle. Thereby, when an increase in the deviation between the actual turning angle and the target turning angle is reduced and the second assist component is included again in the assist command value, a settling time for the turning angle feedback control becomes longer and assist torque becomes unstable. This leads to driver discomfort.

SUMMARY OF THE INVENTION

The object of the present invention is to provide an electric power steering apparatus which can suppress occurrence of self-excited vibration in an ideal model and eliminate driver discomfort.

In order to achieve the above object, a first aspect of the present invention provides an electric power steering apparatus. The electric power steering apparatus is provided with an assist mechanism for applying assist force of a motor to a steering mechanism of a vehicle, and a control unit for controlling the driving of the motor on the basis of an assist command value. The control unit has a basic assist component calculating unit for calculating a first assist component on the basis of steering torque applied to the steering mechanism, a turning angle command value calculating unit for calculating a turning angle command value on the basis of an ideal model obtained by modeling an ideal turning angle of a steerable wheel corresponding to input information including steering torque applied to the steering mechanism, a turning angle feedback control unit for calculating a second assist component by execution of turning angle feedback control for matching a turning angle of the steerable wheel with the turning angle command value, and an assist command value calculating unit for calculating the assist command value based on a value obtained by adding the second assist component to the first assist component. When a deviation between the turning angle of the steerable wheel and the turning angle command value is out of an allowable range, the control unit removes the second assist component from the assist command value and changes the ideal model to enhance convergence in the turning angle feedback control system.

DETAILED DESCRIPTION OF THE PREFERRED EMBODIMENTS

The following description will explain an electric power steering apparatus of the present embodiment with reference to FIGS. 1 to 6.

Figure 1:
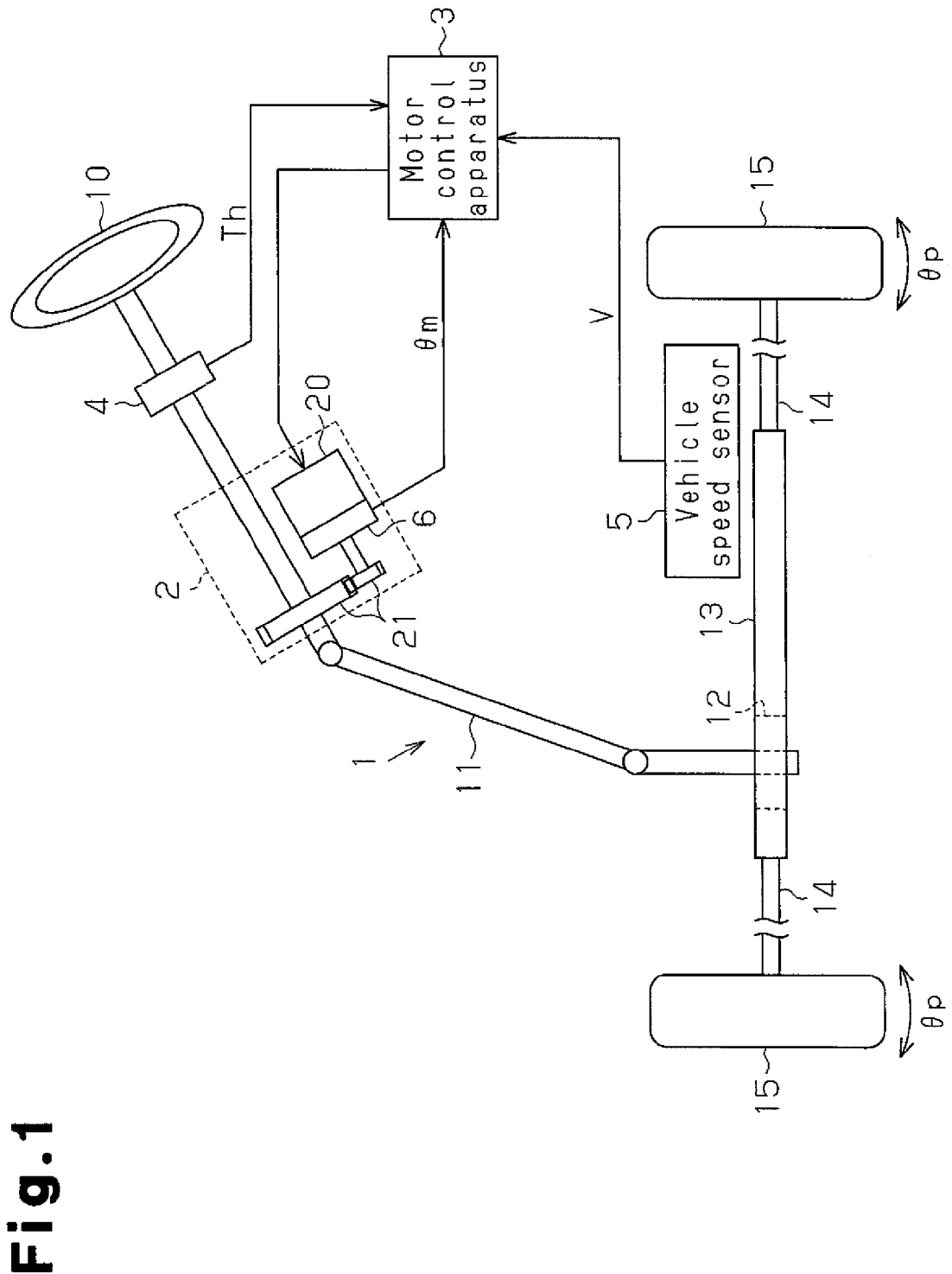
FIG. 1 is a block diagram for illustrating an embodiment according to an electric power steering apparatus of the present invention.

As illustrated in FIG. 1, an electric power steering apparatus is provided with a steering mechanism 1 and an assist mechanism 2. The steering mechanism 1 turns steerable wheels 15 on the basis of operation of a steering wheel 10 by a driver. The assist mechanism 2 assists steering operation by a driver.

The steering mechanism 1 is provided with a steering shaft 11 which rotates integrally with the steering wheel 10. A lower end of the steering shaft 11 is connected with a rack shaft 13 via a rack-and-pinion mechanism 12. Both ends of the rack shaft 13 are connected with tie rods 14. When the steering shaft 11 rotates with steering operation by a driver, rotary motion of the steering shaft 11 is converted into reciprocal linear movement of the rack shaft 13 via the rack-and-pinion mechanism 12. Furthermore, the reciprocal linear movement of the rack shaft 13 is transmitted to the steerable wheels 15 via the tie rods 14. In such a manner, a turning angle θp of the steerable wheels 15 changes and the vehicle traveling direction is changed.

The assist mechanism 2 is provided with a motor 20 for applying assist torque to the steering shaft 11. The motor 20 is constituted of a three-phase AC motor. Rotation of the motor 20 is transmitted to the steering shaft 11 via a gear mechanism 21. In such a manner, motor torque is applied to the steering shaft 11 and therefore, steering operation by a driver is assisted.

The electric power steering apparatus is provided with various kinds of sensors for detecting operation quantity of the steering wheel 10 or vehicle state quantity. The steering shaft 11 is provided with a torque sensor 4. The torque sensor 4 detects steering torque Th applied to the steering shaft 11 during steering operation by a driver. The vehicle is provided with a vehicle speed sensor 5 for detecting a traveling speed V of the vehicle. The motor 20 is provided with a rotation angle sensor 6 for detecting a rotation angle θm of the motor 20. Outputs from these sensors are imported into a motor control apparatus 3 as a control unit. The motor control apparatus 3 controls the driving of the motor 20 on the basis of outputs from the respective sensors.

Figure 2:
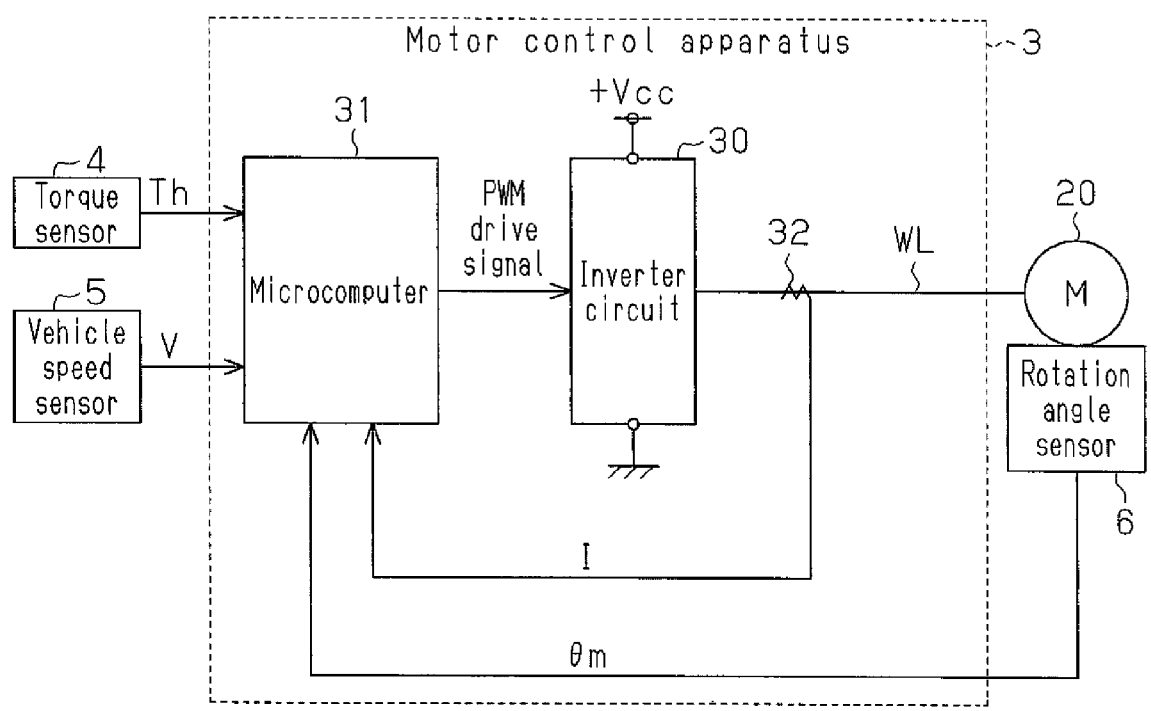
FIG. 2 is a block diagram for illustrating a motor control apparatus which constitutes an electric power steering apparatus.

As illustrated in FIG. 2, the motor control apparatus 3 is provided with an inverter circuit 30, and a microcomputer 31 for driving the inverter circuit 30 by PWM (Pulse Width Modulation). The inverter circuit 30 converts direct current supplied from a power source voltage "+Vcc" of an in-vehicle battery or the like into AC current of three phases composed of a U phase, a V phase and a W phase.

The inverter circuit 30 converts the direct current supplied from a power source into AC current of three phases on the basis of a PWM drive signal from the microcomputer 31. The three-phase AC current is supplied to the motor 20 via a feeder line WL. The feeder line WL is provided with a current sensor 32 for detecting each phase current value I flowing through the feeder line WL. Outputs from the current sensor 32 are imported into the microcomputer 31.

The microcomputer 31 also imports outputs from the torque sensor 4, the vehicle sensor 5 and the rotation angle sensor 6. The microcomputer 31 generates a PWM drive signal on the basis of the steering torque Th, the vehicle speed V, the motor rotation angle θm and each phase current value I detected by the respective sensors. By outputting the PWM drive signal to the inverter circuit 30, the microcomputer 31 drives the inverter circuit 30 by PWM and controls the driving of the motor 20.

Next, drive control of the motor 20 by the microcomputer 31 will be described in detail with reference to a control block in FIG. 3.

Figure 3:
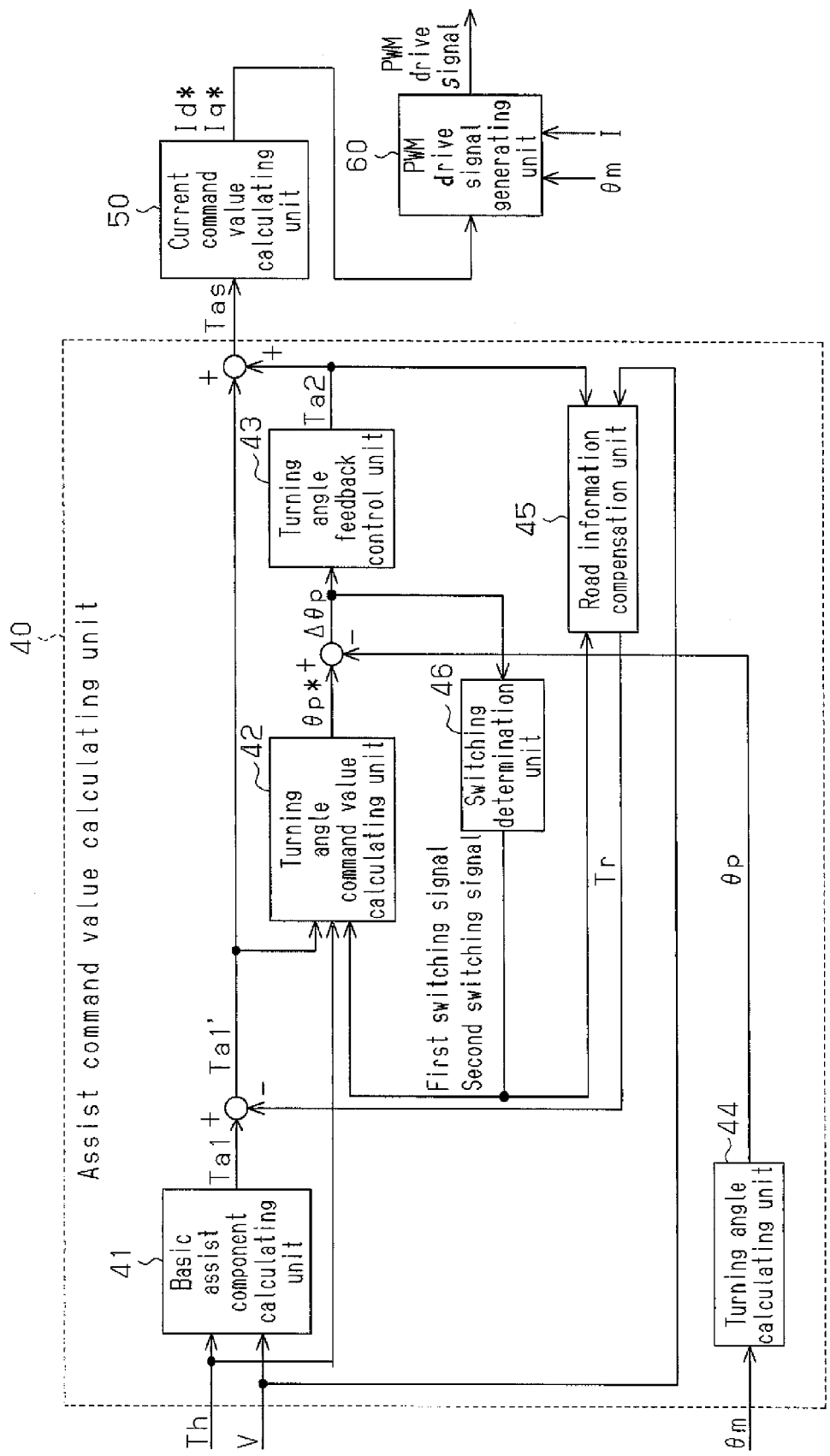
FIG. 3 is a block diagram of a microcomputer which constitutes a motor control apparatus.

As illustrated in FIG. 3, the microcomputer 31 is provided with an assist command value calculating unit 40. The assist command value calculating unit 40 calculates an assist command value Tas on the basis of the steering torque Th, the vehicle speed V and the motor rotation angle θm.

Figure 4:
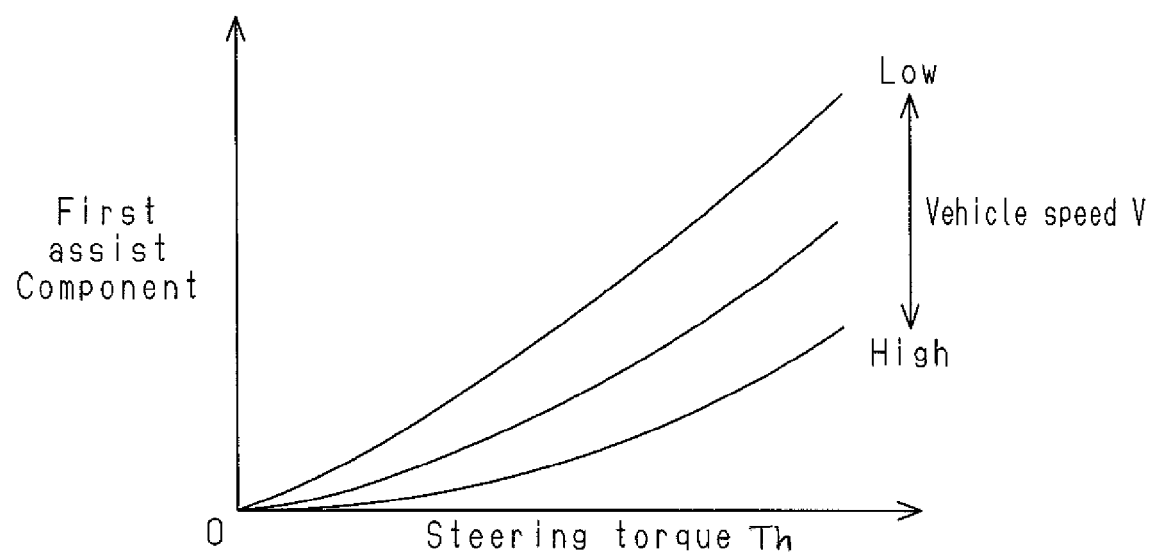
FIG. 4 is a graph showing a relationship between steering torque, a vehicle speed and a first assist component.

The assist command value calculating unit 40 is provided with a basic assist component calculating unit 41. The basic assist component calculating unit 41 calculates a first assist component Ta1, which is a basic component of the assist command value Tas, on the basis of the steering torque Th and the vehicle speed V. The basic assist component calculating unit 41 calculates the first assist component Ta1 from the vehicle speed V and the steering torque Th by using a map illustrated in FIG. 4. As illustrated in FIG. 4, the absolute value of the first assist component Ta1 is set at a larger value as the absolute value of the steering torque Th becomes larger or as the vehicle speed V becomes lower.

As illustrated in FIG. 3, the assist command value calculating unit 40 performs correction to subtract a correction value Tr from the value of the first assist component Ta1 calculated by the basic assist component calculating unit 41. A corrected first assist component Ta1' is outputted to a turning angle command value calculating unit 42.

The turning angle command value calculating unit 42 also imports the steering torque Th in addition to the corrected first assist component Ta1'. The turning angle command value calculating unit 42 adds the first assist component Ta1' to the steering torque Th to obtain driving torque Td. The turning angle command value calculating unit 42 calculates a turning angle command value θp* on the basis of an ideal model obtained by modeling an ideal turning angle corresponding to the driving torque Td. The turning angle command value θp* is a target value of the turning angle θp.

As illustrated in FIG. 1, the motor 20 is connected with the steering shaft 11 via the gear mechanism 21. Therefore, the motor rotation angle θm and the rotation angle of the steering shaft 11 have correlation with each other. Moreover, the motor rotation angle θm and the turning angle θp of the steerable wheels 15 also have correlation with each other. As illustrated in FIG. 3, the assist command value calculating unit 40 is provided with a turning angle calculating unit 44. The turning angle calculating unit 44 calculates an actual turning angle θp of the steerable wheels 15 from the motor rotation angle θm by using the above correlations. The assist command value calculating unit 40 calculates a deviation Δθp (=θp*−θp) between the turning angle command value θp* and the actual turning angle θp. The deviation Δθp is output respectively to a turning angle feedback control unit 43 and a switching determination unit 46.

The turning angle feedback control unit 43 performs feedback control on the basis of the deviation Δθp to match the actual turning angle θp with the turning angle command value θp* and generates a second assist component Ta2.

The switching determination unit 46 outputs a first switching signal or a second switching signal to the turning angle command value calculating unit 42 and a road information compensation unit 45 on the basis of the deviation Δθp. More specifically, the switching determination unit 46 outputs the first switching signal when the deviation Δθp is within a predetermined allowable range. The switching determination unit 46 outputs the second switching signal when the deviation Δθp is outside the allowable range. The allowable range of the deviation Δθp is a range of the deviation Δθp which can ensure stability of the turning angle feedback control in a state where a first ideal model to be described later is used. The range is preset through experiments or the like.

Next, an ideal model of the turning angle command value calculating unit 42 will be described in detail.

An ideal model is divided into an EPS-side ideal model and a vehicle-side ideal model. An EPS-side ideal model depends on characteristics of each element, such as the steering shaft 11 or the motor 20, which constitutes the electric power steering apparatus. A vehicle-side ideal model depends on characteristics of a vehicle side on which the electric power steering apparatus is mounted. The EPS-side ideal model can be constituted of a viscosity term proportional to a first-order time differential value θp' of the turning angle θp, and an inertia term proportional to a second-order time differential value θp" of the turning angle θp. The viscosity term is decided by friction or the like acting between the steering mechanism 1 and a housing or the like surrounding the steering mechanism 1. The inertia term is decided by inertia movement occurring in the steering mechanism 1 during steering operation by a driver.

On the other hand, a vehicle-side ideal model can be constituted of a spring term proportional to the turning angle θp. The spring term is decided by specifications of a suspension or a wheel alignment of a vehicle, a grip force of the steerable wheels 15 and the like. In the present embodiment, the driving torque Td, which is an addition value of the first assist component Ta1' and the steering torque Th, is modeled as the total sum of the spring term, the viscosity term and the inertia term. That is, the driving torque Td is modeled with the following expression (1) when a spring coefficient which is a constant of proportionality of the spring term is represented as K, a viscosity coefficient which is a constant of proportionality of the viscosity term is represented as C, and an inertia moment which is a constant of proportionality of the inertia term is represented as J.

$$Td = K \times \theta p + C \times \theta p' + J \times \theta p'' \qquad (1)$$

Figure 5:
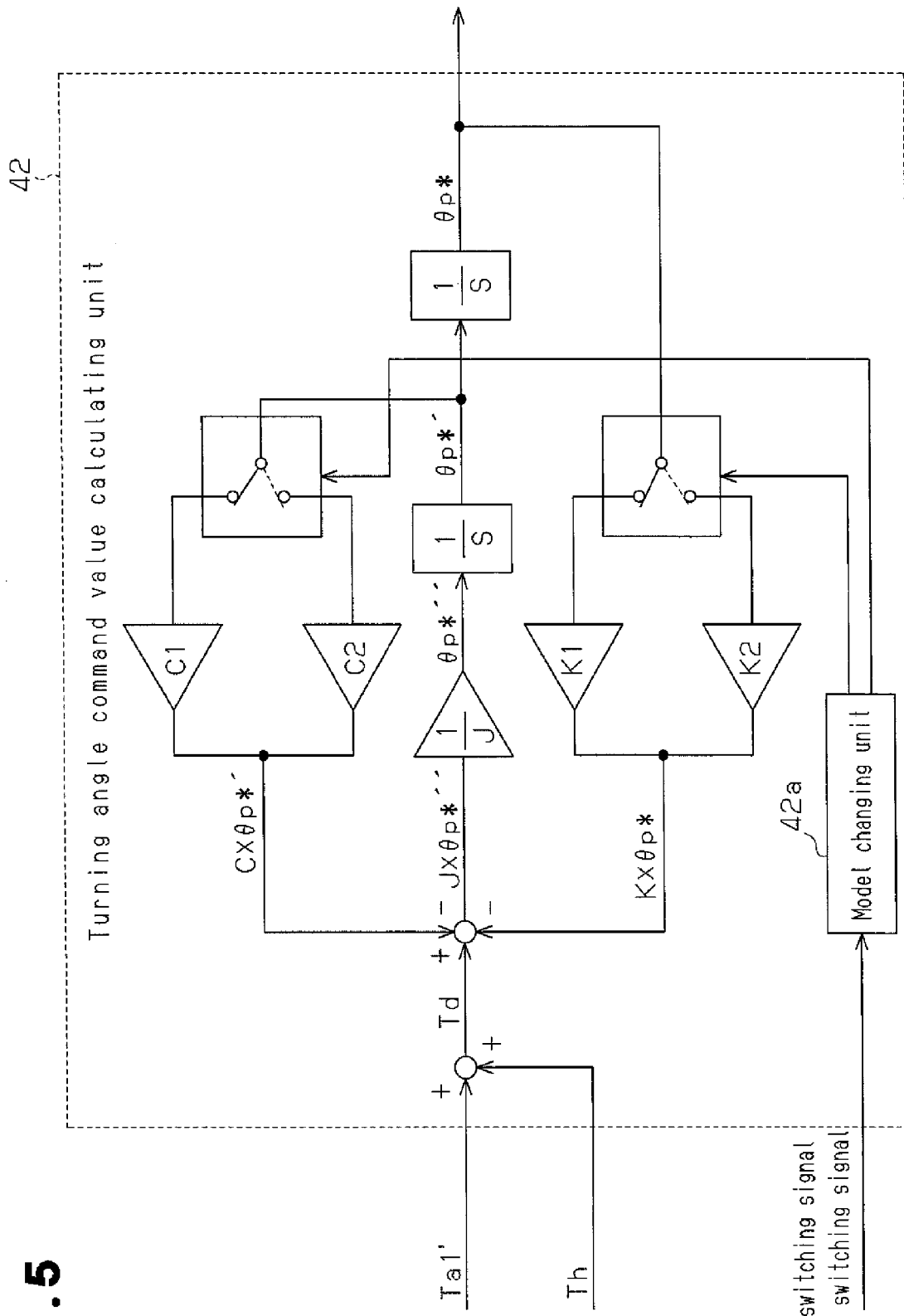
FIG. 5 is a block diagram of a turning angle command value calculating unit which constitutes a motor control apparatus.

The turning angle command value calculating unit 42 calculates the turning angle command value θp* from the driving torque Td by using the expression (1). More specifically, the turning angle command value calculating unit 42 first adds the corrected first assist component Ta1' to the steering torque Th to calculate the driving torque Td as illustrated in FIG. 5. Next, the turning angle command value calculating unit 42 subtracts a spring term "K×θp*" and a viscosity term "C×θp*'" from the driving torque Td to calculate an inertia term "J×θp*''". The turning angle command value calculating unit 42 then divides the inertia term "J×θp*''" by an inertia coefficient J to calculate the second-order time differential value θp''. The turning angle command value calculating unit 42 then integrates the second-order time differential value θp'' to calculate the first-order time differential value θp'. The turning angle command value calculating unit 42 further integrates the first-order time differential value θp' to calculate the turning angle command value θp*.

Moreover, the turning angle command value calculating unit 42 is provided with a model changing unit 42a for changing an ideal model. The model changing unit 42a changes the ideal model by switching a spring coefficient K and a viscosity coefficient C selectively. The model changing unit 42a normally sets the spring coefficient K and the viscosity coefficient C of the ideal model respectively at a first spring coefficient K1 and a first viscosity coefficient C1 as illustrated with solid lines in FIG. 5. An ideal model using the first spring coefficient K1 and the first viscosity coefficient C1 will be hereinafter referred to as a first ideal model. The first ideal model is preset through experiments in view of the convergence in a turning angle feedback control system of a case where the second assist component Ta2 is included in the assist command value Tas, to obtain a desired steering sensation.

When the second switching signal from the switching determination unit 46 is inputted in a state where the first ideal model is used, the model changing unit 42a changes the spring coefficient K and the viscosity coefficient C of the ideal model respectively to a second spring coefficient K2 and a second viscosity coefficient C2 as illustrated with broken lines in FIG. 5. An ideal model using the second spring coefficient K2 and the second viscosity coefficient C2 will be hereinafter referred to as a second ideal model. The second ideal model is preset through experiments or the like in view of the convergence in the turning angle feedback control system of a case where the second assist component Ta2 is not included in the assist command value Tas.

The present embodiment has been made by focusing attention on the fact that convergence characteristics of an ideal model are determined principally by the spring term and the viscosity term of the expression (1). Therefore, characteristics of an ideal model are changed and self-excited vibration of inside of the ideal model is suppressed by changing the spring coefficient K from the first spring coefficient K1 to the second spring coefficient K2, and the viscosity coefficient C from the first viscosity coefficient C1 to the second viscosity coefficient C2. Furthermore, when the first switching signal from the switching determination unit 46 is input, the model changing unit 42a returns the ideal model from the second ideal model to the first ideal model.

As described above, the turning angle command value calculating unit 42 sets the turning angle command value θp* by using either the first ideal model or the second ideal model. That is, the turning angle feedback control unit 43 illustrated in FIG. 3 sets the second assist component Ta2 on the basis of a turning angle command value θp* corresponding to the first ideal model, or a turning angle command value θp* corresponding to the second ideal model. The assist command value calculating unit 40 then adds the corrected first assist component Ta1' to the second assist component Ta2 to calculate the assist command value Tas. The assist command value calculating unit 40 outputs the assist command value Tas to a current command value calculating unit 50.

The current command value calculating unit 50 calculates a current command value Iq* on the q axis in a d/q coordinate system on the basis of the assist command value Tas. The current command value calculating unit 50 outputs the current command value Iq* to a PWM drive signal generating unit 60. In the present embodiment, a current command value Id* on the d axis is set at "0". The current command value calculating unit 50 also outputs the current command value Id* to the PWM drive signal generating unit 60.

The PWM drive signal generating unit 60 also imports each phase current value I and the motor rotation angle θm in addition to the current command values Id* and Iq* from the current command value calculating unit 50. The PWM drive signal generating unit 60 converts each phase current value I into a d-axis current value and a q-axis current value in the d/q coordinate system by using the motor rotation angle θm. The PWM drive signal generating unit 60 then performs feedback control based on a deviation between a current value and a current command value so that the d-axis current value becomes the current command value Id* and the q-axis current value becomes the current command value Iq*, and generates a PWM drive signal. In such a manner, the inverter circuit 30 performs PWM drive and assist torque is applied from the motor 20 to the steering shaft 11.

With such a structure, the second assist component Ta2 generated by the turning angle feedback control is included in the assist command value Tas. Therefore, the turning angle θp of the steerable wheels 15 is controlled to follow the turning angle command value θp*. In such a manner, the turning angle θp is maintained at the turning angle command value θp* and therefore, it is possible to precisely suppress vibration of the steering mechanism 1 to be caused by disturbance. Moreover, by arbitrarily adjusting the respective values of the spring coefficients K1 and K2, the viscosity coefficients C1 and C2 and the inertia coefficient J in the turning angle command value calculating unit 42 illustrated in FIG. 5, it is possible to form any characteristics controllably regardless of actual characteristics of a vehicle on which the electric power steering apparatus is mounted. That is, it is possible to realize a desired steering sensation by using the first ideal model.

Moreover, it is possible to suppress self-excited vibration in an ideal model effectively by using the second ideal model.

On the other hand, the assist command value calculating unit 40 is provided with a road information compensation unit 45 for calculating the correction value Tr on the basis of the second assist component Ta2 and the vehicle speed V.

Figure 6:
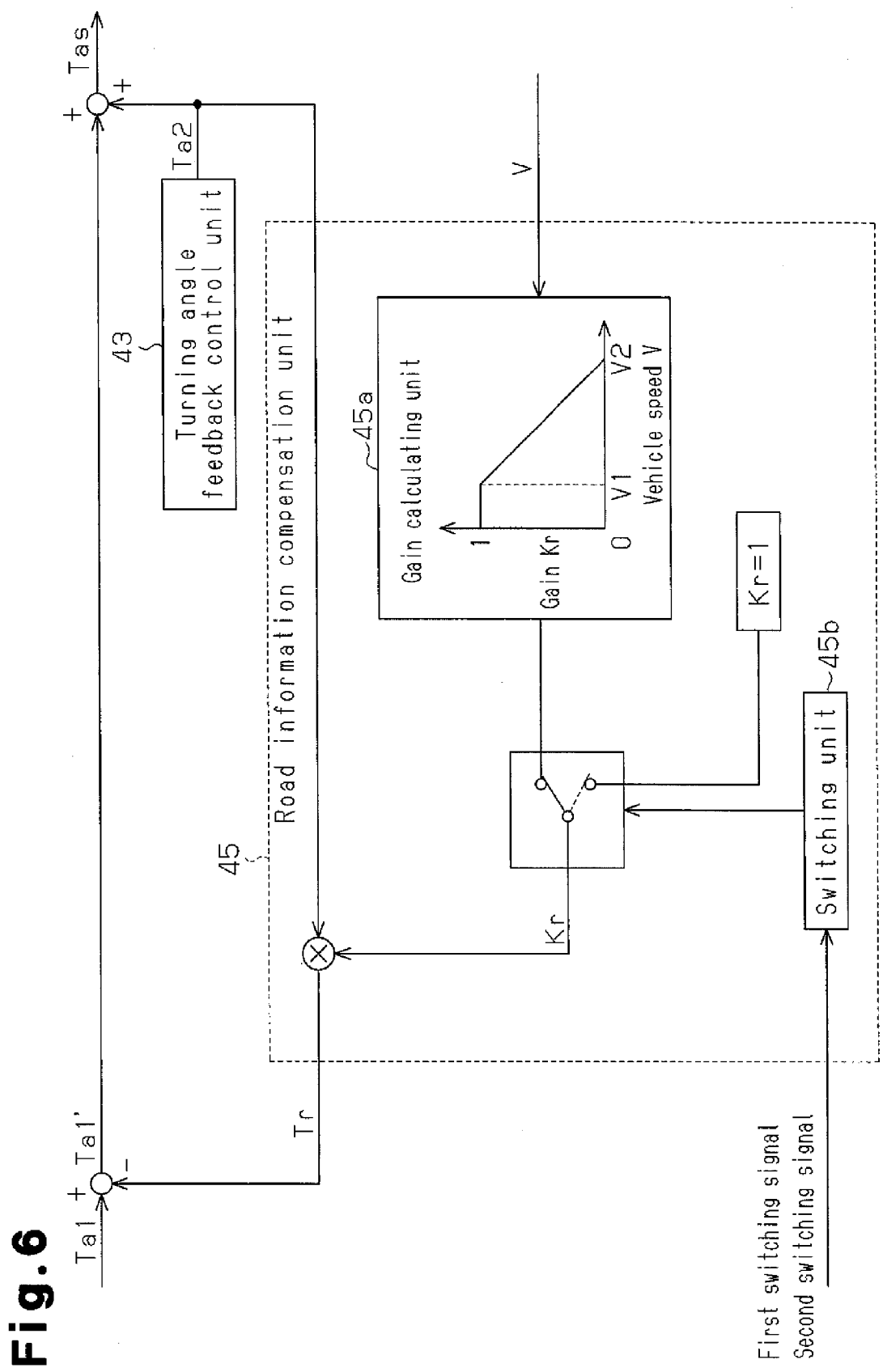
FIG. 6 is a block diagram for illustrating a road information compensation unit which constitutes a motor control apparatus.

As illustrated in FIG. 6, the road information compensation unit 45 is provided with a gain calculating unit 45a and a switching unit 45b. The gain calculating unit 45a calculates a gain Kr on the basis of the vehicle speed V. In low speed traveling wherein the vehicle speed V is within the range of "0≤V<1", the gain calculating unit 45a sets the gain Kr at "1". In middle speed traveling wherein the vehicle speed V is within the range of "V1≤V<V2", the gain calculating unit 45a decreases the gain Kr linearly within a range from "1" to "0" as the vehicle speed V becomes higher. In high speed travelling wherein the vehicle speed V is within the range of "V2≤V", the gain calculating unit 45a sets the gain Kr at "0".

The road information compensation unit 45 multiplies the second assist component Ta2 by the gain Kr calculated by the gain calculating unit 45a to calculate the correction value Tr. That is, the correction value Tr changes within the range of "0≤Tr≤Ta2" according to the vehicle speed V. Therefore, the corrected first assist component Ta1' becomes "Ta1−Kr·Ta2". Accordingly, the assist command value Tas becomes "Ta1+ (1−Kr)·Ta2". As described above, the road information compensation unit 45 is a control unit for decreasing the absolute value of the second assist component Ta2 included in the assist command value Tas as the vehicle speed V becomes slower.

With such a structure, the second assist component Ta2 is removed from the assist command value Tas in low speed traveling. Therefore, assist torque caused by the turning angle feedback control no longer acts on the steering shaft 11. Accordingly, reverse input torque from the steerable wheels 15 is transmitted to the driver without being cancelled. Therefore, the driver can obtain a road surface state (road information). As the vehicle speed V becomes higher, the second assist component Ta2 included in the assist command value Tas becomes larger and assist torque caused by the turning angle feedback control is more likely to act on the steering shaft 11. Especially, in high speed traveling wherein the vehicle speed V is equal to or higher than a speed V2, it is possible to cancel reverse input torque from the steerable wheels 15 with assist torque caused by the turning angle feedback control. In such a manner, it is possible to precisely ensure stability of vehicle traveling in high speed traveling.

On the other hand, the switching unit 45b switches the gain Kr on the basis of an output signal from the switching determination unit 46. More specifically, the switching unit 45b sets the gain Kr at a calculation result of the gain calculating unit 45a when the output signal from the switching determination unit 46 is the first switching signal. The switching unit 45b sets the gain Kr at a fixed value "1" as illustrated with broken lines in FIG. 6 when the output signal from the switching judgment unit 46 is the second switching signal.

Next, the action of the motor control apparatus 3 of the present embodiment will be explained.

As illustrated in FIG. 5, a driver can obtain a desired steering sensation by setting the ideal model of the turning angle command value calculating unit 42 at the first ideal model. However, when unexpected disturbance is inputted into the steering system in execution of the turning angle feedback control, the deviation Δθp between the actual turning angle θp and the turning angle command value θp* sometimes increases significantly. In such a case, control becomes unstable. This leads to self-excited vibration in the ideal model. That is, when the deviation Δθp is too large, it is impossible to apply assist torque corresponding to the deviation Δθp. When the turning angle feedback control is continued in such a situation, shortage of assist torque may be promoted. In such a case, the turning angle command value calculating unit 42 cannot calculate an appropriate turning angle command value θp*. Therefore, the second assist component Ta2 becomes unstable and it becomes impossible to ensure stability of the turning angle feedback control system.

For example, in a state where the deviation Δθp increases over a predetermined allowable range as a result of self-excited vibration in the ideal model and the first ideal model is used, it sometimes becomes difficult to ensure stability of the turning angle feedback control system. In this regard, the switching determination unit 46 outputs the second switching signal to the road information compensation unit 45 in the present embodiment. In such a manner, the switching unit 45b of the road information compensation unit 45 sets the gain Kr at a fixed value "1". Therefore, the second assist component Ta2 is removed from the assist command value Tas. Consequently, even when the second assist component Ta2 is unstable, the influence is not reflected in the assist command value Tas. Therefore, a more stable steering sensation can be obtained. When the deviation Δθp returns to the predetermined allowable range, the switching determination unit 46 outputs the first switching signal to the road information compensation unit 45. In such a manner, the switching unit 45b of the road information compensation unit 45 sets the gain Kr at a calculation result of the gain calculating unit 45a. Therefore, the second assist component Ta2 is included in the assist command value Tas. In such a manner, it is possible to precisely ensure the steering sensation of the driver.

While the gain Kr is set at a fixed value "1", calculation of the turning angle command value θp* by the turning angle command value calculating unit 42, and calculation of the second assist component Ta2 by the turning angle feedback control unit 43 are continued. In such a manner, even when the second assist component Ta2 is included again in the assist command value Tas, the turning angle command value calculating unit 42 and the turning angle feedback control unit 43 can calculate the turning angle command value θp* and the second assist component Ta2 on the basis of the calculation result obtained up to this point. In such a manner, a settling time for switching of the ideal model becomes shorter than a case where calculation of the second assist component Ta2 is stopped, and it becomes easier to realize stable control.

While the gain Kr is set at a fixed value "1", that is, while the second assist component Ta2 is removed from the assist command value Tas, assist torque to cause the actual turning angle θp to follow the turning angle command value θp* does not act on the steering shaft 11. Therefore, characteristics of the turning angle feedback control system are changed substantially. In such a manner, self-excited vibration occurs at the ideal model and the second assist component Ta2 may become unstable. In such a case, when the second assist component Ta2 is added again to the assist command value Tas afterwards, the assist command value Tas becomes unstable and vibration may occur at the steering mechanism 1. As a result, the driver may experience discomfort.

In this regard, the switching determination unit 46 outputs the second switching signal to the turning angle command value calculating unit 42 in the present embodiment when the deviation Δθp between the turning angle command value θp* and the actual turning angle θp is out of the allowable range and the second assist component Ta2 is removed from the assist command value Tas. At this point, the model changing unit 42a of the turning angle command value calculating unit 42 changes the ideal model from the first ideal model to the second ideal model. In such a manner, the convergence of the turning angle feedback control system wherein the second assist component Ta2 is removed from the assist command value Tas is enhanced. Therefore, self-excited vibration in the ideal model is suppressed and the second assist component Ta2 becomes stable. Accordingly, a settling time in the turning angle feedback control system is short and the assist command value Tas becomes stable even when the second assist component Ta2 is added again to the assist command value Tas afterwards. That is, assist torque becomes stable and therefore, it is possible to eliminate driver discomfort.

When the deviation Δθp between the turning angle command value ep* and the actual turning angle ep returns to the allowable range, the switching determination unit 46 outputs the first switching signal to the turning angle command value calculating unit 42. At this point, the model changing unit 42a of the turning angle command value calculating unit 42 returns the ideal model to the first ideal model. A driver can, therefore, obtain a desired steering sensation.

Consequently, the following effects can be obtained with an electric power steering apparatus of the present embodiment.

(1) When the deviation Δθp between the actual turning angle θp and the turning angle command value θp* is out of the allowable range, the motor control apparatus 3 removes the second assist component Ta2 from the assist command value Tas and changes the ideal model to enhance the convergence in the turning angle feedback control system. In such a manner, the second assist component Ta2 becomes stable while the second assist component Ta2 is removed from the assist command value Tas. Therefore, the assist command value Tas also becomes stable when the second assist component Ta2 is added to the assist command value Tas afterwards. That is, assist torque becomes stable and therefore, it is possible to eliminate driver discomfort.

(2) As an ideal model of the turning angle command value calculating unit 42, the driving torque Td which is an addition value of the steering torque Th and the first assist component Ta1' is modeled as an addition value of the spring term, the viscosity term and the inertia term. By changing the spring coefficient K of the spring term and the viscosity coefficient C of the coefficient term to change the ideal model, it is possible to enhance the convergence of the turning angle feedback control easily.

It is to be noted that the above embodiment may be changed into the following configurations.

Although both of the spring coefficient K and the viscosity coefficient C are changed for changing the ideal model in the above embodiment, only one of the spring coefficient K and the viscosity coefficient C may be changed.

Although the basic assist component calculating unit 41 sets the first assist component Ta1 on the basis of the steering torque Th and the vehicle speed V in the above embodiment, the basic assist component calculating unit 41 may set the first assist component Ta1 on the basis of only the steering torque Th, for example. Moreover, so-called phase compensation control may be executed for changing the phase of a detected steering torque Th of the torque sensor 4 on the basis of a change gradient (assist gradient) of the first assist component Ta1 to the steering torque Th. Furthermore, so-called damper control may be executed for decreasing the first assist component Ta1 as the rotation speed of the steering shaft 11 becomes higher. In a case where the basic assist component calculating unit 41 executes damper control, it is possible to apply a viscous feeling to the steering sensation of the driver by execution of the control. Accordingly, the viscosity term may be excluded from the first ideal model of the turning angle command value calculating unit 42. More specifically, the first viscosity coefficient C1 illustrated in FIG. 5 may be set at "0". In a case where the viscosity term is excluded from the first ideal model, self-excited vibration is more likely to occur at the turning angle feedback control system as the deviation Δθp between the turning angle command value θp* and the actual turning angle θp becomes larger. In such a case, for suppressing self-excited vibration, it is especially effective to change the ideal model of the turning angle command value calculating unit 42 to the second ideal model having the viscosity term on the condition that the deviation Δθp between the actual turning angle θp and the turning angle command value θp* is out of the allowable range. In such a manner, it becomes easier to realize a stable second assist component Ta2 since it is possible to suppress self-excited vibration of the turning angle feedback control system even when the viscosity term is excluded from the first ideal model.

In the above embodiment, the road information compensation unit 45 may be omitted. In such a case, it is required to separately provide an adjustment unit for adjusting the magnitude of the second assist component Ta2 included in the assist command value Tas in accordance with whether the deviation Δθp is within the allowable range or not.

Although the model illustrated in FIG. 5 is used as the ideal model of the turning angle command value calculating unit 42 in the above embodiment, the ideal model may be changed arbitrarily. For example, an ideal model excluding an inertial feeling, an ideal model having a newly-added frictional feeling or the like may be used. Moreover, an ideal model for setting the turning angle command value θp* on the basis of only the steering torque Th may be used. Any ideal model may be used as long as the ideal model can be changed so that a desired steering sensation is obtained and the convergence of the turning angle feedback control is enhanced.

In the above embodiment, the motor control apparatus 3 may be applied not only to an electric power steering apparatus for applying assist torque to the steering shaft 11 but also to an electric power steering apparatus for applying assist torque to the rack shaft 13 or the like.

The invention claimed is:

1. An electric power steering apparatus comprising:
an assist mechanism that applies assist force of a motor to a steering mechanism of a vehicle; and
a control unit having control logic configured to cause the control unit to control drive of the motor on the basis of an assist command value, the control unit comprising:
a basic assist component calculating unit that calculates a first assist component on the basis of steering torque applied to the steering mechanism;
a turning angle command value calculating unit that calculates a turning angle command value on the basis of an ideal model obtained by modeling an ideal turning angle of a steerable wheel corresponding to input information including steering torque applied to the steering mechanism;
a turning angle feedback control unit that calculates a second assist component by execution of turning angle feedback control for matching a turning angle of the steerable wheel with the turning angle command value; and
an assist command value calculating unit that calculates the assist command value based on a value obtained by adding the second assist component to the first assist component, wherein
when a deviation between the turning angle of the steerable wheel and the turning angle command value is out of an allowable range, the control unit removes the second assist component from the assist command value, and changes the ideal model to enhance convergence in the turning angle feedback control system.

2. The electric power steering apparatus according to claim 1, wherein
the ideal model is constituted of an ideal model representing an addition value of the steering torque and the first assist component as an addition value of a plurality of terms, the plurality of terms including a spring term proportional to the turning angle, and a viscosity term proportional to a first-order time differential value of the turning angle; and
the ideal model is changed by changing at least one of a constant of proportionality of the spring term and a constant of proportionality of the viscosity term.

3. The electric power steering apparatus according to claim 1, wherein
when the second assist component is removed from the assist command value, the turning angle command value calculating unit continues calculation of the turning angle command value, and the turning angle feedback control unit continues calculation of the second assist component.

4. The electric power steering apparatus according to claim 1, wherein
the control unit further comprises a switching determination unit that outputs a first switching signal when the deviation between the turning angle of the steerable wheel and the turning angle command value is within the allowable range, and outputs a second switching signal when the deviation is out of the allowable range, and
the control unit performs control so that (i) the second assist component is removed from the assist command value in accordance with the second switching signal, and (ii) the second assist component is included in the assist command value in accordance with the first switching signal.

5. The electric power steering apparatus according to claim 1, wherein
the turning angle command value calculating unit (i) obtains driving torque by adding a corrected first assist component to steering torque, and (ii) calculates a turning angle command value on the basis of an ideal model obtained by modeling an ideal turning angle corresponding to the driving torque.

6. The electric power steering apparatus according to claim 1, wherein
the control unit further comprises a road information compensation unit that calculates a correction value to be used for correcting the first assist component, and
the road information compensation unit calculates the correction value on the basis of the second assist component and a vehicle speed.

7. The electric power steering apparatus according to claim 6, wherein
the road information compensation unit calculates the correction value so that the second assist component included in the assist command value is decreased as the vehicle speed becomes lower.

8. An electric power steering apparatus comprising:
an assist mechanism that applies assist force of a motor to a steering mechanism of a vehicle; and
a control unit having control logic configured to cause the control unit to:
calculate a first assist component on the basis of steering torque applied to the steering mechanism;
calculate a turning angle command value on the basis of an ideal model obtained by modeling an ideal turning angle of a steerable wheel corresponding to input information including steering torque applied to the steering mechanism;
calculate a second assist component by execution of turning angle feedback control for matching a turning angle of the steerable wheel with the turning angle command value; and
calculate the assist command value based on a value obtained by adding the second assist component to the first assist component, wherein
when a deviation between the turning angle of the steerable wheel and the turning angle command value is out of an allowable range, the control unit removes the second assist component from the assist command value and changes the ideal model to enhance convergence in the turning angle feedback control system.

* * * * *